(12) United States Patent
Kikitsu et al.

(10) Patent No.: US 6,493,164 B1
(45) Date of Patent: Dec. 10, 2002

(54) MAGNETIC RECORDING APPARATUS AND METHOD OF MAGNETIC RECORDING

(75) Inventors: Akira Kikitsu; Katsutaro Ichihara, both of Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/525,047

(22) Filed: Mar. 14, 2000

(30) Foreign Application Priority Data

Mar. 15, 1999 (JP) .......................................... 11-068185

(51) Int. Cl.[7] ................................................ G11B 5/64
(52) U.S. Cl. ...................................... 360/59; 360/97.01
(58) Field of Search ................................ 360/59, 97.01

(56) References Cited

U.S. PATENT DOCUMENTS

| | | | |
|---|---|---|---|
| 3,562,760 A | | 2/1971 | Cushner et al. |
| 3,582,570 A | | 6/1971 | Cushner et al. |
| 5,583,727 A | | 12/1996 | Parkin |
| 5,652,054 A | * | 7/1997 | Kikitsu et al. ............ 204/192.2 |
| 5,981,054 A | * | 11/1999 | Hikosaka et al. ......... 204/192.2 |

FOREIGN PATENT DOCUMENTS

| | | |
|---|---|---|
| JP | 10-269502 | 10/1998 |
| JP | 10-289434 | 10/1998 |

OTHER PUBLICATIONS

IBM Technical Disclosure Bulletin, vol. 40, No. 10, p. 65, XP-000739424, "Thermally-Assisted Magnetic Recording", Oct. 1997.

* cited by examiner

*Primary Examiner*—David Hudspeth
*Assistant Examiner*—Varsha A. Kapadia
(74) *Attorney, Agent, or Firm*—Oblon, Spivak, McClelland, Maier & Neustadt, P.C.

(57) ABSTRACT

A magnetic recording apparatus having a magnetic recording medium having a recording layer formed on a substrate, the recording layer being constituted by magnetic grains and a nonmagnetic material formed between the magnetic grains, a heating unit configured to heat the recording layer, and a magnetic recording unit configured to apply a magnetic field to the recording layer. The magnetic recording medium, the heating unit and the magnetic recording unit are constituted so as to meet the following relationship:

$$T/RKu(T) < 11200/(ln(t)+20.72)$$

where, setting that Ku(T) is magnetic anisotropy energy density of the recording-layer at a temperature T, and Ku(Ta) is that at ambient temperature, RKu(T) represents a ratio Ku(T)/Ku(Ta), and t represents an elapsed time after the magnetic field application is completed.

14 Claims, 3 Drawing Sheets

MAGNETIC RECORDING APPARATUS AND METHOD OF MAGNETIC RECORDING

CROSS-REFERENCE TO RELATED APPLICATION

This application is based upon and claims the benefit of priority from the prior Japanese Patent Application No. 11-068185, filed Mar. 15, 1999, the entire contents of which are incorporated herein by reference.

BACKGROUND OF THE INVENTION

The present invention relates to a magnetic recording apparatus in which recording and reproduction of information are performed magnetically and to a method of magnetic recording.

With improvement in computer processing speed in recent years, a magnetic recording apparatus (e.g., hard disk drive (HDD)) designed to record and reproduce information is required to improve recording speed and density more and more. However, there is a physical limitation in increasing the recording density.

In order to perform high-density recording with a magnetic recording apparatus, it is required to make small magnetic domains recorded in a recording layer. In order to distinguish the small recording magnetic domains, it is required that magnetic domain edges are smooth. In order to meet the above requirement, it is required to reduce the size of magnetic grains constituting the recording layer. It is also required to reduce the thickness of the recording layer for high-density recording, which also results in reducing the size of magnetic grains. However, when the magnetic grain size is reduced, magnetic anisotropy energy of the magnetic grain (i.e., the product of magnetic anisotropy energy density Ku and the volume of the magnetic grain) would likely to be smaller than thermal fluctuation energy. If the magnetic anisotropy energy of magnetic grains becomes smaller than the thermal fluctuation energy, magnetization of the recorded magnetic domains would be reversed again, thereby making it no more possible to retain the recorded information. This phenomenon is referred to as a thermal fluctuation limit or a superparamagnetic limit. It is conceivable, for the purpose of preventing the magnetization reversal due to the thermal fluctuation, to increase Ku of magnetic grains. However, when Ku of magnetic grains become higher, the coercive force of the magnetic grains would increase in proportion to Ku. Therefore, it may become impossible to reverse the magnetization by means of a magnetic field generated by an ordinary recording head.

BRIEF SUMMARY OF THE INVENTION

An object of the present invention is to provide a magnetic recording apparatus and a method of magnetic recording, which make it possible to perform such high-density recording as exceeding the thermal fluctuation limit.

According to the present invention, there is provided a magnetic recording apparatus comprising a magnetic recording medium having a recording layer formed on a substrate, the recording layer being constituted by magnetic grains and a nonmagnetic material formed between them, a heating unit configured to heat the recording layer, and a magnetic recording unit configured to apply a magnetic field to the recording layer, wherein the magnetic recording medium, the heating unit and the magnetic recording unit are constituted so as to meet the following relationship:

$$T/RKu(T) < 11200/(ln(t)+20.72)$$

where, setting that Ku(T) is magnetic anisotropy energy density of the recording layer at a temperature T, and Ku(Ta) is that at ambient temperature, RKu(T) represents a ratio Ku(T)/Ku(Ta), and t represents an elapsed time after the magnetic field application is completed.

In the magnetic recording apparatus of the present invention, the recording layer preferably has coercive force of 4 kOe or more at ambient temperature.

According to the present invention, there is provided a method of magnetic recording for a magnetic recording medium comprising a recording layer formed on a substrate and constituted by magnetic grains and a nonmagnetic material formed between them, the method comprising steps of heating the recording layer, and applying a magnetic field to the recording layer, thereby performing recording, wherein the steps meet the following relationship:

$$T/RKu(T) < 11200/(ln(t)+20.72)$$

where, setting that Ku(T) is magnetic anisotropy energy density of the recording layer at a temperature T, and Ku(Ta) is that at ambient temperature, RKu(T) represents a ratio Ku(T)/Ku(Ta), and t represents an elapsed time after the magnetic field application is completed.

In the present invention, a method may be used, for example, in which the recording layer is heated such that RKu(Tmax) at the highest temperature Tmax becomes 0.01 or less in the heating step, and the recording operation is completed within 1 ns to 50 ns after the recording layer reaches the highest temperature in the recording step.

In the present invention, another method may be used in which the recording layer is heated such that RKu(T) becomes 0 before the recording layer reaches the highest temperature in the heating step, and the recording operation is completed within 20 ns to 100 ns after the recording layer reaches the highest temperature in the recording step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A magnetic recording apparatus according to the present invention comprises a magnetic recording medium, a heating unit and a magnetic recording unit. In the apparatus of the present invention, heating the recording layer of the magnetic recording medium is performed by making use of the heating unit, and then a magnetic field is applied to the recording layer by making use of the magnetic recording unit, thereby recording is performed. This method is referred to as thermal assisted recording. When the temperature of a magnetic layer is raised, the coercive force thereof is reduced, so that magnetization of magnetic layer can be reversed by application of a magnetic field, which enables magnetic recording. The magnetic recording apparatus of the present invention can perform magnetic recording even to a magnetic material having coercive force Hc of 4 kOe or more at ambient temperature.

The magnetic recording medium of the present invention has a structure in which a recording layer constituted by magnetic grains and a nonmagnetic material formed between the magnetic grains is formed on a substrate. An underlayer may be interposed between the substrate and the recording layer. Also, a protective layer may be formed on the recording layer.

The substrate serves to support the recording layer and may be formed of metal, glass, ceramics, etc.

The recording layer is so-called granular layer constituted by magnetic grains and a nonmagnetic material formed between the magnetic grains. The recording layer having such a structure can be formed as follows. For example, when a magnetic material is deposited on a substrate by sputtering, as in the case of forming a recording layer of an ordinary hard disk, columnar magnetic crystals grow and, at the same time, a nonmagnetic element is caused to segregate around the magnetic crystals, so that a nonmagnetic material (grain boundary) is formed between the magnetic grains.

Alternatively, a continuous film of an amorphous magnetic material may be deposited on a substrate, followed by processing the continuous film to form columnar magnetic grains. Depositing a nonmagnetic material on the entire surface of the substrate and polishing the resultant surface can form the structure where a nonmagnetic material is formed between the magnetic grains. Also, simply coating a lubricant on the entire surface of the substrate can form the structure where a nonmagnetic material is formed between the magnetic grains.

As a material for forming the recording layer, a magnetic material exhibiting high saturation magnetization Is and high magnetic anisotropy is suitable. It is possible to employ, as such a magnetic material, at least one kind of magnetic metallic materials selected from the group consisting of Co, Pt, Sm, Fe, Ni, Cr, Mn, Bi, Al and an alloy of these metals. Among these magnetic metallic materials, a Co-based alloy having a high crystalline magnetic anisotropy, especially a CoPt-based alloy, a SmCo-based alloy and a CoCr-based alloy are preferable. Specific examples of magnetic metallic material are Co—Cr, Co—Pt, Co—Cr—Ta, Co—Cr—Pt, Co—Cr—Ta—Pt, Co and Fe.

It is possible to employ, as a magnetic material, an amorphous rare-earth transition metal alloy such as Tb—Fe, Tb—Fe—Co, Tb—Co, Gd—Tb—Fe—Co, Gd—Dy—Fe—Co, Nd—Fe—Co and Nd—Tb—Fe—Co; an ordered alloy such as PtMnSb and FePt; a magnetic oxide such as Co ferrite and Ba ferrite.

For the purpose of controlling magnetic properties such as saturation magnetization and coercive force, at least one kind of elements selected from Fe and Ni can be added to the above magnetic material. Further, for the purpose of improving the magnetic properties, an element such as Cr, Nb, V, Ta, Ti, W, Hf, Cr, V, In, Si, B or a compound of these elements with at least one element selected from oxygen, nitrogen, carbon and hydrogen may be added to the above magnetic material.

The recording layer may be the one exhibiting an in-plane magnetic anisotropy like the recording layer of a hard disk, or the one exhibiting a perpendicular magnetic anisotropy as the recording layer of a magnetooptical disk.

An underlayer may be consisting of a magnetic material or a nonmagnetic material. An underlayer consisting of a magnetic material can be magnetically coupled with magnetic domains in the recording layer through exchange coupling interaction or magnetostatic coupling interaction. When a magnetic underlayer with high coercivity disposed under the recording layer and exchange-coupled with the magnetic domains in the recording layer, the magnetic domains can be stabilized. Further, when a magnetic underlayer having a high magnetization is disposed under the recording layer and exchange-coupled with the magnetic domains in the recording layer, the output signals can be enhanced.

An underlayer consisting of a nonmagnetic material can be disposed for the purpose of controlling the crystallinity of the recording layer, or for the purpose of preventing impurities, originating from the substrate, from mixing to the recording layer. For example, when an underlayer having a lattice constant, close to the crystal lattice constant of the recording layer is disposed, the crystallinity of the recording layer can be controlled. An example of such an underlayer is a Cr layer. By making use of an amorphous underlayer, the recording layer may be made into amorphous, in general. For the purpose of preventing impurities, originating from the substrate, from mixing to the recording layer, a thin film having a small lattice constant or a dense thin film should preferably be employed as the underlayer.

Further, the magnetic underlayer may be also provided with the above-mentioned function of the nonmagnetic underlayer. For example, the magnetic underlayer may serve to control the crystallinity of the recording layer. In this case, both the effect of improving the read/write characteristics and the effect of improving the crystallinity can be obtained. An example of such an underlayer is an amorphous CoZrNb underlayer.

Note that the underlayer may consist of a modified surface layer of the substrate. The modified surface layer can be obtained by means of ion plating, the doping of a gaseous component, a neutron beam irradiation, etc. In this case, the step of depositing an underlayer can be omitted.

As a protective layer, it is possible to employ carbon, SiN, $SiO_2$, Au or a stack of these materials.

A heating unit may be designed to heat the entire surface of the recording medium or to heat locally the surface of the recording medium. When a high-density magnetic recording medium is heated, it is generally suffered from influence of thermal fluctuation, resulting in deteriorating the data storage property. Therefore, it is desired that local heating be performed to keep most of the recording medium maintained at ambient temperature. However, in the case of a magnetic recording apparatus having a recording medium whose data storage property is hardly deteriorated even when it is entirely heated, heating entirely may be preferred in view of cost reduction.

Examples of a heating unit that enables high-speed local heating, it is conceivable to employ heating using a laser as in an optical disk, induction heating, or heating by means of a probe heated by heating wire. It is also possible, for performing more localized heating, to employ a heating system in which a laser beam is focused via a lens on the surface of the recording medium, a heating system in which induction heating is performed using a fine antenna attached to the tip end of a probe, or a heating system in which heating is performed by using a heating probe whose tip end facing the medium is sharpened as fine as possible or whose tip end is positioned as close as possible to the medium. These heating means may be positioned in the side of recording surface or in the opposite side to the recording surface of the recording medium.

As a magnetic recording unit, it is possible to employ an ordinary magnetic recording head. The recording head forms a magnetic circuit constituted by a magnetic pole and an induction coil. It is also possible to employ a permanent magnet as the magnetic recording unit. When a permanent magnet is employed, the permanent magnet is disposed in such a manner capable of varying the distance to the recording medium or the permanent magnet is finely processed so as to apply a high-resolution magnetic field in high-speed. It is also possible to employ, as a means for applying a magnetic field, an additional magnetic layer stacked on the recording layer. When temperature distribution is produced in the additional magnetic layer by means of heating or light irradiation, a magnetization distribution is produced in the layer, by which a magnetic field can be applied to the recording layer. A leakage magnetic field generated from the magnetic layer may be applied to the recording layer as a recording magnetic field.

Figure 1:
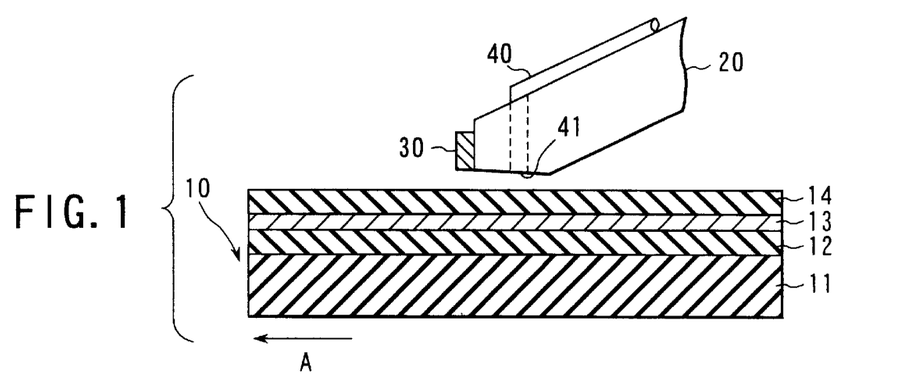
FIG. 1 is a schematical view showing an embodiment of a magnetic recording apparatus according to the present invention.

An embodiment of a magnetic recording apparatus according to the present invention will be explained with reference to FIG. 1. In FIG. 1, a magnetic recording medium 10 has a structure in which an underlayer 12, a recording layer 13 and a protective layer 14 are successively stacked on a disk substrate 11. The magnetic recording medium 10 is rotated in the direction indicated by the arrow A in FIG. 1.

Over the magnetic recording medium 10 is disposed a slider 20, on the end face of which a read/write element 30 is mounted. A portion of the recording element in the read/write element 30 functions as a magnetic recording unit (means for applying a magnetic field). The slider 20 is provided with a light-waveguide 40 to transmit a laser beam, so that a laser beam is irradiated from the end portion 41 of the waveguide 40 onto the medium 10. The slider 20 is designed to glide over the magnetic recording medium 10 when it is rotated. The waveguide 40 and the read/write element 30 are arranged in such a manner that a laser beam is first irradiated from the end portion 41 of the waveguide 40 onto the recording layer 13 for heating, and then a magnetic field is applied to the recording layer 13 by the recording element.

According to the magnetic recording apparatus of the present invention, the recording operation is performed in such a manner that the temperature and magnetic property of the recording layer satisfy the following formula (1) in relative to an elapsed time t after the application of a magnetic field to the recording layer is completed (i.e., after recording).

$$T/RKu(T) < 11200/(ln(t)+20.72) \tag{1}$$

where T is a temperature of the recording layer. Also, assuming that Ku(T) is a value of magnetic anisotropy energy density of the recording layer at a temperature T and Ku(Ta) is that at ambient temperature Ta, RKu(T) represents a ratio between the two values, i.e., Ku(T)/Ku(Ta). As long as the recording layer satisfies the formula (1), it is possible to form uniform and distinct magnetic domains in the recording layer even if the recording layer is constituted by magnetic grains having a small size and a high coercive force. As a result, it is possible to perform a high-density magnetic recording exceeding the thermal fluctuation limit.

The relationship of the formula (1) will be explained in more detail below.

Figure 2:
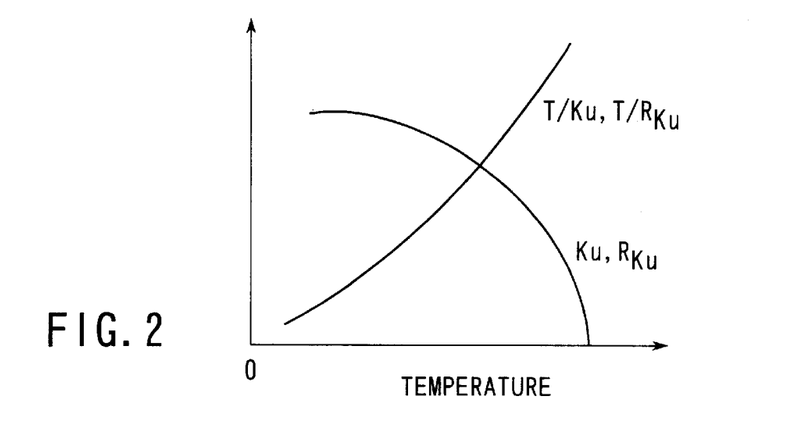
FIG. 2 is a graph illustrating relationships between Ku, RKu, T/Ku and T/RKu and temperature T.

Among the physical properties related to the magnetization reversal of a recording layer, the magnetic anisotropy energy density Ku changes greatly with temperature. The magnetic anisotropy energy density Ku decreases monotonously with increase in temperature T. Since the coercive force Hc changes approximately in proportion to change in Ku, it also decreases with increase in temperature T. To the contrary, the value T/RKu(T) in the formula (1) increases monotonously with increase in temperature T. FIG. 2 illustrates qualitative relationships between these functions.

Figure 3:
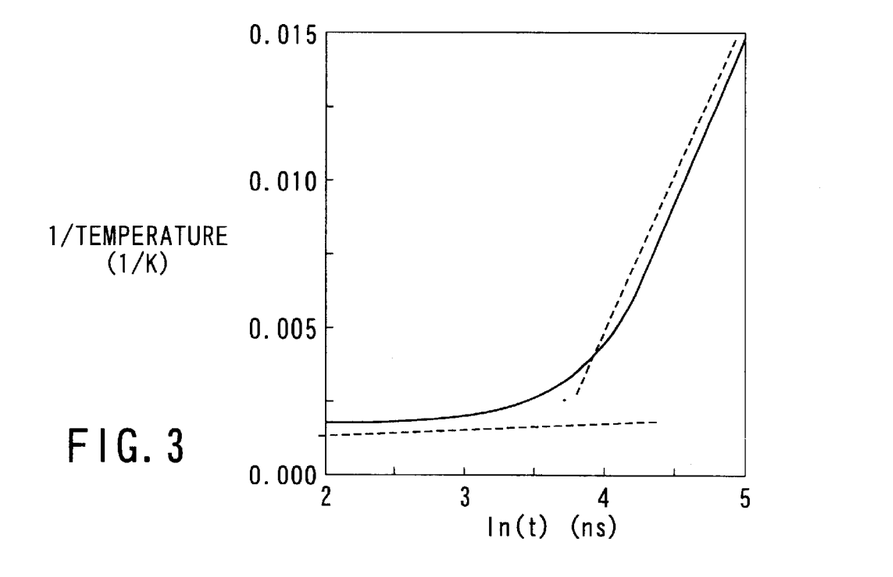
FIG. 3 is a graph illustrating relationships between the logarithm ln(t) of elapsed time t after recording and the reciprocal 1/T of temperature T in a magnetic recording medium according to the present invention.

First, the present inventors simulate a temperature response of the recording medium having a stacked structure of thin films as shown in FIG. 1 by irradiating a laser beam onto the medium. As a result, it is found that there is a simple relationship between the reciprocal 1/T of temperature T of the recording medium and the logarithm ln(t) of an elapsed time t after completion of magnetic field application. FIG. 3 shows an example of the relationship between the reciprocal 1/T of temperature T of the recording medium and the logarithm ln(t) of elapsed time t after the completion of magnetic field application. As apparent from FIG. 3, 1/T is approximately proportional to ln(t) in the initial stage as well as in the latter stage of the cooling process of the recording medium, so that the relationships between them can be approximated by a couple of straight lines (dashed lines in FIG. 3). Accordingly, the present inventors expect that conditions capable of achieving a complete recorded state can be found out by investigating the recorded states in relative to ln(t) through read/write experiments under various conditions of temperature response in the recording layer, even if it may be unclear when the magnetization reversal takes place in the cooling process of recording medium.

A change in the magnetic anisotropy energy density Ku that is closely related to the magnetization reversal of the recording layer changes monotonously with T as described above. However, since both T and Ku change together during the process of cooling of the recording layer, it is difficult to correlate these variables individually with the recording state. Therefore, the present inventors find out that either a function Ku/T that decreases with temperature, or a function RKu/T that is obtained by normalizing Ku/T with the Ku value at ambient temperature would be useful to be correlated to ln(t).

Based on this estimation, read/write experiments are performed as follows.

Employed is a magnetic recording medium 10 as shown in FIG. 1 which is constructed by stacking a 70 nm-thick Cr layer as an underlayer 12, a 20 nm-thick CoPtCr alloy layer as a recording layer 13, and a 10 nm-thick carbon layer as a protective layer 14 on a 2.5-inch thick glass disk substrate 11. The recording layer 13 formed of the CoPtCr alloy layer has a Ku of $8 \times 10^6$ erg/cc at ambient temperature and coercive force of 4 kOe.

The magnetic recording medium 10 is rotated in the direction indicated by the arrow A at a rate of 4,500 rpm, and the flying height of the slider 20 is set to 80 nm. A laser beam 650 nm in wavelength and 3 mW in power is continuously irradiated onto the recording medium 10 through the end portion 41 of the light waveguide 40, and a magnetic field is applied by the recording element to the recording medium 10, thereby performing recording at a recording frequency of 200 kfci. A beam spot size on the surface of the recording medium is set to 2 μm in full width at half maximum. The recording track width is 2 μm. The recorded state of the recording medium is determined by observing magnetic domains with a magnetic force microscope (MFM).

With this apparatus, it is impossible to form distinct magnetic domains when no laser beam is irradiated onto the recording medium. Whereas, when the laser beam is irradiated onto the recording medium under the aforementioned conditions, it is confirmed that magnetic domains are formed.

Further, in order to study conditions where the magnetic domains are formed, recording experiments are performed with various rotational speeds of the recording medium as well as heating conditions by the laser beam. Thereafter, the recording medium is observed with MFM to examine whether uniform and distinctive magnetic domains are formed or not.

In this case, the Ku(T) value of the recording medium is determined from measurement, and RKu(T) is calculated. The temperature of the recording medium is determined based on a simulation.

Figure 4:
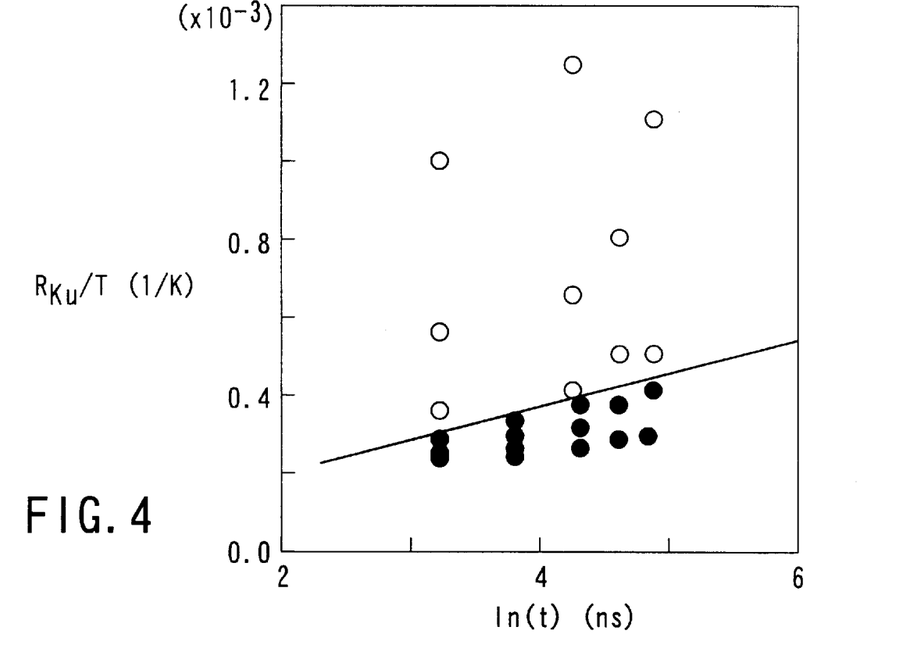
FIG. 4 is a graph illustrating relationships between RKu/T and ln(t) in the magnetic recording medium according to the present invention.

The experiment results are depicted in a coordinate system of RKu/T and ln(t). The open circles in FIG. 4 denote where the magnetic domains are formed, while the solid circles denote where the magnetic domains are not formed. It will be seen that it is possible to perform recording under the conditions within the region on the upper side of the straight line shown in this figure. This relationship can be expressed by the following formula.

$$RKu(T)/T > (ln(t)+20.72)/11200 \quad (2)$$

Figure 5:
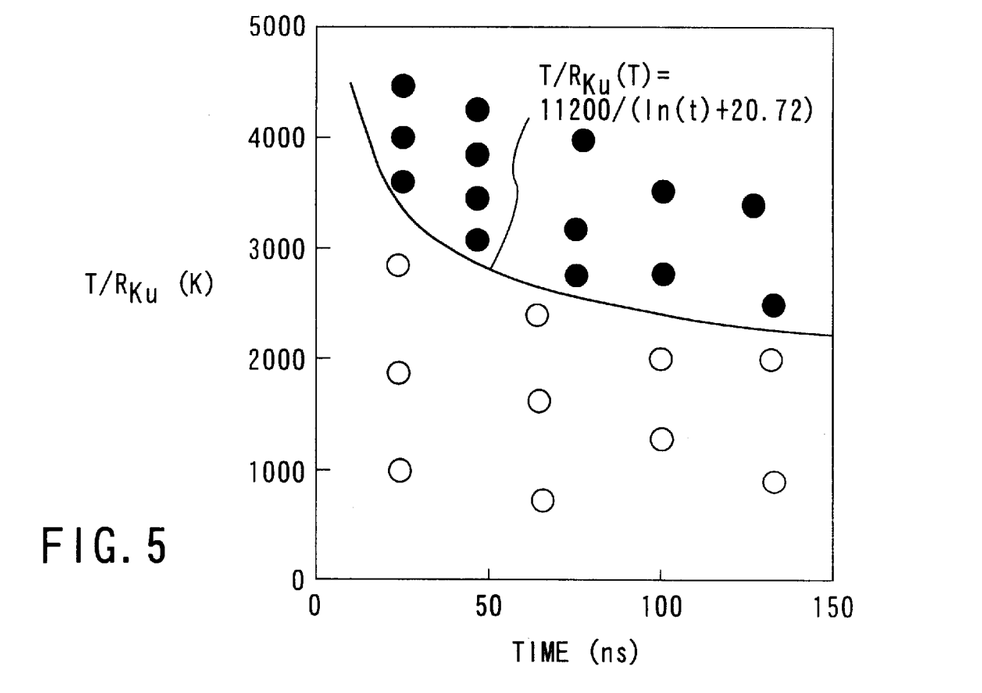
FIG. 5 is a graph illustrating relationships between T/RKu and an elapsed time t after recording in the magnetic recording medium according to the present invention.

In order to allow understanding easily the relationship that the temperature T lowers with the elapsed time t, the experimental results are depicted in a coordinate system of T/RKu and elapsed time t after recording in FIG. 5. The open circles in FIG. 5 also denote where the magnetic domains are formed, while the solid circles denote where the magnetic domains are not formed. FIG. 5 shows that it is possible to perform recording under the conditions within a region on the lower side of the curve. The relationship in FIG. 5 is obtained by exchanging the denominator and the numerator of the formula (2), which is expressed the following formula.

$$T/RKu(T) < 11200/(ln(t)+20.72) \quad (1)$$

As long as the aforementioned formula (1) is satisfied, the magnetic domains can be formed in the recording layer.

Figure 6:
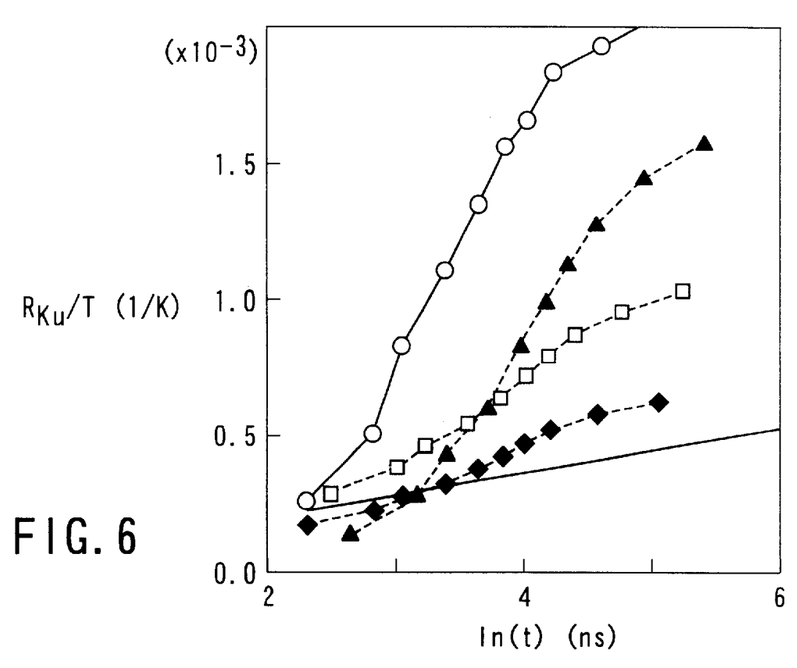
FIG. 6 is a graph illustrating relationships between RKu/T and ln(t) in the magnetic recording medium according to the present invention.

In the same manner as mentioned above, the heating and magnetic recording to the recording medium are performed under four conditions so as to trace change in RKu/T every elapsed time after recording. The four conditions are selected near the boundary in FIG. 5. The experimental results are depicted in a coordinate system of RKu/T and ln(t) in FIG. 6. Four marks in FIG. 6 correspond to the four conditions, respectively. The open circles in FIG. 6 also denote where the magnetic domains are formed, while the solid circles denote where the magnetic domains are not formed. The region on the upper side of the straight line in FIG. 6 is expressed by the aforementioned formula (2). FIG. 6 shows that if there is any moment where the formula (2) is not satisfied after recording, even temporary it may be, magnetic domains cannot be formed in the recording layer under that condition.

Figure 7:
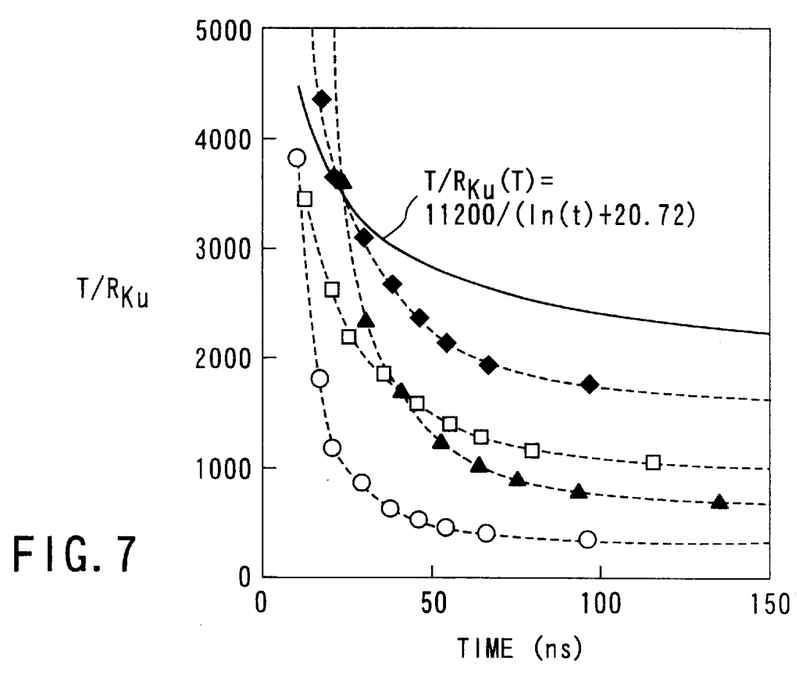
FIG. 7 is a graph illustrating relationships between T/RKu and an elapsed time t after recording in the magnetic recording medium according to the present invention.

In order to allow understanding easily the relationship that the temperature T lowers with the elapsed time t, the experimental results are depicted in a coordinate system of T/RKu and elapsed time t after recording in FIG. 7. The marks in FIG. 7 have the same meanings as in FIG. 6. In FIG. 7, the region on the lower side of the curve is expressed by the aforementioned formula (1). FIG. 7 shows that if there is any moment where the formula (1) is not satisfied after recording, even temporary it may be, magnetic domains cannot be formed in the recording layer under that condition. Therefore, it can be concluded that the condition expressed by the formula (1) is required to meet at any time in the cooling process after recording.

According to the magnetic recording apparatus of the present invention, the magnetic recording medium, the heating unit and the magnetic recording unit are constituted such that the recording operation can be performed so as to satisfy the aforementioned formula (1). Next, the factors that should be taken into account so as to satisfy the formula (1) will be explained below.

The manner of change in temperature of the recording layer can be controlled as follows. For example, it is possible to employ a recording medium in which a heat sink layer having high heat conductivity, or a heat-insulating layer consisting of dielectric material having low heat conductivity is disposed in the vicinity of the recording layer as adopted in an optical recording medium. When the heat sink layer is provided, the ratio of change in temperature T of the recording layer in relative to the time t (dT/dt) becomes high, thereby making it possible to attain sharp temperature change. As a material for the heat sink layer, a conductive material such as Ag can be employed. On the other hand, when the heat-insulating layer is provided, (dT/dt) becomes small, thereby making it possible to attain moderate temperature change. As a material for the heat-insulating layer, a dielectric material such as $SiO_2$ may be used.

Further, when both of the heat sink layer and the dielectric layer are provided, it will be possible to design a desired temperature change in the recording layer. Such a recording medium can be applicable to the system using either laser heating or induction heating. In a system using laser heating, dT/dt of the recording medium can be controlled by providing a light absorption layer whose absorption and thickness are suitably adjusted.

The temperature dependency of Ku, and therefore RKu (T) of the recording layer can be controlled by selecting suitable material for the recording layer. It is preferable in the present invention that the coercive force Hc of the recording layer is 4 kOe or more in order to allow recording to a recording layer containing fine magnetic grains by way of heating and to make it possible to retain the recorded data at ambient temperature.

When the recording layer is made from ferromagnetic CoPt, since the Curie temperature lowers as the Pt content increases, it is possible to enlarge dKu/dT in the vicinity of the ambient temperature. The same effect like this can also be obtained in a CoPtCr recording layer by increasing the Cr content. Generally speaking, increasing the content of a nonmagnetic element in the recording layer can enlarge dKu/dT in the vicinity of ambient temperature. On the other hand, when an element serves to raise the Curie temperature is added to the recording layer, the contrary effect to that described above can be obtained.

When the recording layer is made from ferrimagnetic TbFeCo, which is employed in a magnetooptical recording medium, decreasing the content of Co can lower the Curie temperature, thereby making it possible to enlarge dKu/dT in the vicinity of ambient temperature. Further, if the recording layer is formed by making use of a ferrimagnetic material having a Curie temperature higher than the maximum temperature of recording layer attained by heating, recording can be performed under the condition where the coercive force Hc is lowered while RKu is kept at a constant value. Since there is a proportional relationship between T/RKu and T in this case, it is advantageous in view of designing the magnetic recording medium.

Adjusting the size of the magnetic grains constituting the recording layer can also control RKu of the recording layer. As mentioned above, the recording layer consisting of CoCrPtTa, for example, which is employed in a hard disk, is constituted by fine magnetic crystalline grains separated from each other so as not to produce exchange coupling interaction. When the recording layer is formed in such a manner that makes the magnetic crystalline grains smaller in size, the influence of thermal energy would become relatively large, so that the value of dKu/dT can be enlarged. By the way, it is possible to minimize this effect by making use of a material having high Ku. By selecting a material having a suitable Ku value, RKu of the recording layer can be controlled. It is also possible, without changing the material of the recording layer, to enlarge the Ku value of the recording layer by arranging the easy axis of magnetization reversal to unidirectional from random in the plane of recording layer.

For the purpose of satisfying the aforementioned condition of the formula (1), the laser heating can be adjusted in various manners as explained below.

(1) The laser power may be adjusted. The larger the laser power, the higher would be the maximum temperature of the recording layer.

(2) The manner of laser beam irradiation may be adjusted. For example, when a laser beam is continuously irradiated, heat flow would occur from a region that has been already passed through by the laser beam. As a result, temperature change of the recording layer would become moderate.

(3) The linear velocity of the recording medium in relative to the laser may be adjusted. More specifically, the rotational speed of the disk may be adjusted. Since increasing the moving speed of the recording medium shorten the irradiation time of laser beam onto a region in the recording layer, temperature rise of the recording layer can be suppressed, and at the same time, the temperature change thereof would become sharp.

(4) The laser may be operated in a pulsed manner, and at the same time, the pulse width may be adjusted. With the pulse width is made narrow, temperature rize of the recording layer can be suppressed, and the temperature change thereof would become sharp.

(5) In addition to the above method (4), the laser power may be adjusted for every pulse. For example, a short pulse of lower power is irradiated in advance for the preliminary heating, and then a pulse of higher power may be subsequently irradiated for main heating. By making use of the method, the temperature rise can be made moderate. In this case, there will be conceivable almost indefinite combinations of pulse width, modulation and power of a pulse train. Therefore, a pulse train having an optimum combinations should be determined in such a manner as to satisfy the condition of the formula (1) for the recording layer exhibiting given RKu(T) characteristics.

(6) The shape of the laser beam spot may be changed. When the shape of the beam spot is made elliptical with its major axis lying along the moving direction of the medium, the temperature change of the recording layer can be made more moderate due to the same effect as mentioned in the above item (2). In this case, the optical system for the laser may be actuated with a piezoelectric element or a micromachine to change the shape of beam spot. By making use of this method, the shape of laser beam can be adjusted in conformity with a type of recording medium exhibiting various RKu(T) characteristics, the linear velocity of the recording medium, and the radius of rotation.

(7) The distance between the recording element for applying a magnetic field and the laser may be adjusted. The larger the distance between the recording element and the laser is, the more moderate would become the temperature change of the recording layer during recording. In this case, the position of irradiating tip end for laser beam may be actuated with a piezoelectric element or a micromachine. By making use of this method, the above distance can be adjusted in conformity with a type of recording medium exhibiting various RKu(T) characteristics, the linear velocity of, the recording medium, and the radius of rotation.

The above methods (1) to (7) may be suitably combined with each other. In the case where other heating unit than the laser is employed, the methods as described above can be applied.

Next, an embodiment where recording is performed on a magnetic recording medium having a recording layer consisting of an amorphous rare-earth transition metal alloy will be explained. Employed is a magnetic recording medium 10 that is constructed by stacking a 110 nm-thick SiN layer as an underlayer 12, a 20 nm-thick GdTbFeCo alloy layer as a recording layer 13, and a 40 nm-thick SiN and a 25 nm-thick Au layer as a protective layer 14 on a 2.5-inch thick glass disk substrate 11.

The GdTbFeCo recording layer 13 is employed for a magnetooptical medium and is a ferrimagnetic material exhibiting a perpendicular magnetic anisotropy. Ku thereof at ambient temperature is $10^8$ erg/cc and coercive force thereof is as high as 8 kOe. Ku of the recording layer 13 decreases almost linearly as the temperature T approaches the Curie temperature. It is possible, by adjusting the composition ratio between GdTb and FeCo, to lower the coercive force Hc greatly without prominently decreasing Ku with temperature rise. This is a characteristic peculiar to the ferrimagnetic material.

The recording medium is rotated at a linear velocity of 8 m/s. By making use of a pick-up for an optical disk, a laser beam having a wavelength of 650 nm is irradiated from the glass substrate side 11. Focusing is performed so as to set the laser beam spot size on the surface of the recording medium to 0.7 $\mu$m. The recording operation is performed by making use of the read/write element 30 that was mounted on the slider 10 as in FIG. 1 at a flying height of 100 nm. While continuously irradiating a laser beam of 3 mW, magnetic recording is performed at a recording frequency of 200 kfci. The recording track width is 2 $\mu$m. Reproduction is performed by making use of a reproducing head comprising a GMR element.

When the recording layer 13 is heated to the maximum temperature, RKu becomes 0.9, but the coercive force Hc is lowered to 0.9 kOe from the value of 8 kOe at ambient temperature. If the coercive force is around this value, an ordinary recording head can form magnetic domains. It is found from estimation of the time dependency of T/RKu in this experiment that the condition of the formula (1) is sufficiently satisfied since the RKu value is large.

However, when the GdTbFeCo recording layer is formed as an amorphous continuous film, domain walls are inevitably formed, thereby making it difficult to form fine magnetic domains.

So, after a continuous film of GdTbFeCo is formed, the film is subjected to electron-beam lithography to form a structure with arrayed columnar magnetic grains each having a diameter of 10 nm and an interval of 10 nm. Thereafter, a recording experiment for the medium is performed in the same manner as explained above, and the magnetic domains are observed with MFM. As a result, it is confirmed that recorded magnetic domains each consisting of a single-domain grain are formed without any domain walls. This means that high-density recording in a unit of a single-domain size can be realized. As explained above, it is found that a magnetic recording medium attainable a higher density can be fabricated by processing the recording layer.

Next, experiments are performed to study a suitable timing for applying a magnetic field to the recording layer after laser beam irradiation. In these experiments, employed is the magnetic recording medium having a CoPtCr recording layer.

(A) The structure of the medium, the laser power and the rotational speed of the disk are adjusted in such a manner that the condition of $RKu \geq 0.01$ can be attained at the maximum temperature of the magnetic recording medium. Recording experiments are performed in such a way that the period from the time when the medium reaches the maximum temperature to the time when recording is completed are set to 1, 2, 5, 10, 20, 50 and 100 ns, respectively. After the recording operation, the recording layer is observed with MFM to examine whether magnetic domains are formed or not. As a result, it is found that stable magnetic domains are formed in all of the conditions except the case with the period of 100 ns. These results are so interpreted that since the coercive force Hc increases with elapsed time after the recording layer reaches the maximum temperature, it becomes difficult to perform stable recording. Also, in order to keep the medium temperature high enough to enable sufficient recording for a period of about 100 ns, the maximum temperature of the medium must be raised. As a result, magnetic domains around would become unstable, with a result that the magnetic domains would be reverted.

(B) The structure of the medium, the laser power and the rotational speed of the disk are adjusted in such a manner that the maximum temperature of the recording layer exceeds the Curie temperature thereof. In this case, the recording medium loses magnetization, and hence, RKu becomes 0 before the recording layer reaches the maximum temperature. Recording experiments are performed in such a way that the period from the time when the medium reaches the maximum temperature to the time when recording is completed are set to 1, 2, 5, 10, 20, 50 and 100 ns, respectively. After the recording operation, the recording layer is observed with MFM to examine whether magnetic domains are formed or not. As a result, it is found that, contrary to the above (A), stable magnetic domains are formed only in the case where the above period is set to 20 ns or more. These results are so interpreted that since the recorded magnetic domains are extremely unstable in the vicinity of RKu=0, the magnetic domains would be reverted if recording is completed within a short time after the recording layer reaches the maximum temperature. By the way, if it is required to take a long time before recording is completed as in this case, it is not desirable in view of improving the recording density and transfer rate. However, since it is possible in this case to employ a recording medium having extremely high coercive force Hc at ambient temperature, it would be-possible to apply the medium to a low velocity magnetic recording system, which is very excellent in archival property.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording apparatus comprising;
   a magnetic recording medium having a recording layer formed on a substrate, said recording layer being constituted by magnetic grains and a nonmagnetic material formed between the magnetic grains;
   a heating unit configured to heat the recording layer; and
   a magnetic recording unit configured to apply a magnetic field to the recording layer;
   wherein said magnetic recording medium, said heating unit and said magnetic recording unit are constituted so as to meet the following relationship:

$$T/RKu(T) < 11200/(ln(t)+20.72)$$

where, setting that Ku(T) is magnetic anisotropy energy density of the recording layer at a temperature T, and Ku(Ta) is that at ambient temperature, RKu(T) represents a ratio Ku(T)/Ku(Ta), and t represents an elapsed time after the magnetic field application is completed.

2. The apparatus according to claim 1, wherein the coercive force of the recording layer is 4 kOe or more at ambient temperature.

3. The apparatus according to claim 1, wherein said recording layer is formed of a Co-based alloy.

4. The apparatus according to claim 1, wherein said recording layer is formed of a rare-earth transition metal alloy.

5. The apparatus according to claim 1, wherein said heating unit is a laser.

6. The apparatus according to claim 1, wherein said magnetic recording unit is a magnetic recording head.

7. The apparatus according to claim 1, wherein said heating unit and said magnetic recording unit are integrally provided.

8. A method of magnetic recording for a magnetic recording medium comprising a recording layer formed on a substrate and constituted by magnetic grains and a nonmagnetic material formed between the magnetic grains, said method comprising steps of;
   heating said recording layer; and
   applying a magnetic field to said recording layer, thereby performing recording;
   wherein said steps meet the following relationship:

$$T/RKu(T) < 11200/(ln(t)+20.72)$$

where, setting that Ku(T) is magnetic anisotropy energy density of the recording layer at a temperature T, and Ku(Ta) is that at ambient temperature, RKu(T) represents a ratio Ku(T)/Ku(Ta), and t represents an elapsed time after the magnetic field application is completed.

9. The method according to claim 8, wherein the coercive force of the recording layer is 4 kOe or more at ambient temperature.

10. The method according to claim 8, wherein said step of heating is performed such that RKu(Tmax) of the recording layer at the highest temperature Tmax becomes 0.01 or less; and said step of recording is performed such that the recording operation is completed within 1 ns to 50 ns after the recording layer reaches the highest temperature.

11. The method according to claim 8, wherein said heating step is performed such that RKu(T) of the recording layer becomes 0 before the recording layer reaches the highest temperature, and said recording step is performed such that the recording operation is completed within 20 ns to 100 ns after the recording layer reaches the highest temperature.

12. The method according to claim 8, wherein said heating unit is a laser.

13. The method according to claim 12, wherein the power of laser beam irradiated from said laser onto the recording layer and the rotational speed of said recording medium are adjusted.

14. The method according to claim 12, wherein said recording layer is irradiated with a pulsed laser beam with the pulse width thereof being adjusted.

* * * * *